(12) United States Patent
Tan

(10) Patent No.: US 10,884,660 B2
(45) Date of Patent: Jan. 5, 2021

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventor: Chen Yap Tan, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 33 days.

(21) Appl. No.: 16/170,064

(22) Filed: Oct. 25, 2018

(65) Prior Publication Data

US 2020/0081653 A1 Mar. 12, 2020

(30) Foreign Application Priority Data

Sep. 7, 2018 (TW) .............................. 107131602 A

(51) Int. Cl.
*G06F 3/06* (2006.01)
*G06F 13/16* (2006.01)

(52) U.S. Cl.
CPC ............ *G06F 3/0659* (2013.01); *G06F 3/061* (2013.01); *G06F 3/0616* (2013.01); *G06F 3/0679* (2013.01); *G06F 13/1642* (2013.01); *G06F 13/1673* (2013.01)

(58) Field of Classification Search
CPC ............................ G06F 3/0659; G06F 13/1642
See application file for complete search history.

(56) References Cited

U.S. PATENT DOCUMENTS

| | | | | |
|---|---|---|---|---|
| 7,015,921 | B1 * | 3/2006 | Trivedi | G06F 12/0831 345/520 |
| 7,538,772 | B1 * | 5/2009 | Fouladi | G06F 13/1605 345/531 |
| 8,244,981 | B2 * | 8/2012 | Wang | G06F 12/125 711/128 |
| 2011/0283066 | A1 * | 11/2011 | Kurashige | G06F 12/0866 711/135 |
| 2017/0153824 | A1 * | 6/2017 | Luan | G06F 3/0683 |
| 2017/0257151 | A1 * | 9/2017 | Lange | H04W 88/00 |
| 2019/0272117 | A1 * | 9/2019 | Feldman | G06F 3/0611 |

* cited by examiner

*Primary Examiner* — Ramon A. Mercado
(74) *Attorney, Agent, or Firm* — JCIPRNET

(57) ABSTRACT

An exemplary embodiment of the disclosure provides a memory management method for a rewritable non-volatile memory module. The method includes: receiving a first type command from a host system and temporarily storing the first type command to a first command queue; after receiving the first type command, receiving a second type command from the host system and temporarily storing the second type command to a second command queue; if the first command queue meets a preset condition, performing a programming operation for programming the rewritable non-volatile memory module according to the first type command in the first command queue; and after performing the programming operation, transmitting a response message corresponding to the second type command in the second command queue to the host system.

24 Claims, 14 Drawing Sheets

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 107131602, filed on Sep. 7, 2018. The entirety of the above-mentioned patent application is hereby incorporated by reference herein and made a part of this specification.

BACKGROUND

Technical Field

The present disclosure relates to a memory management technology, and more particularly to a memory management method, a memory storage device, and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

During the operation of the memory storage device, the host system can issue a specific command, to the memory storage device, which instructs a moving of all of the data in the buffer memory to the rewriteable non-volatile memory module. In general, every time this specific command is received, the memory storage device will move the data in the buffer memory. However, in some cases, the host system may send multiple of these specific commands in a short period of time, which causes the memory storage device to perform the data moving frequently. As a result, write amplification may significantly increase and the life time of the memory storage device may be reduced.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

The present disclosure provides a memory management method, memory storage device, and memory control circuit unit to improve the above problems.

A memory management method for a rewriteable non-volatile memory module is provided according to an exemplary embodiment of the disclosure. The memory management method includes: receiving a first type command from a host system and temporarily storing the first type command to a first command queue; after receiving the first type command, receiving a second type command from the host system and temporarily storing the second type command to a second command queue; if the first command queue meets a preset condition, performing a programming operation according to the first type command in the first command queue to program the rewriteable non-volatile memory module; and after performing the programming operation, transmitting a response message corresponding to the second type command in the second command queue to the host system.

A memory storage device including a connection interface unit, a rewritable non-volatile memory module and a memory control circuit unit is provided according to an exemplary embodiment of the disclosure. The connection interface unit is configured to couple to a host system. The memory control circuit unit is coupled to the connection interface unit and the rewritable non-volatile memory module. The memory control circuit unit is configured to receive a first type command from the host system and temporarily store the first type command to a first command queue. After receiving the first type command, the memory control circuit unit is further configured to receive a second type command from the host system and temporarily store the second type command to a second command queue. If the first command queue meets a preset condition, the memory control circuit unit is further configured to transmit a write command sequence which instructs a programming operation for programming the rewriteable non-volatile memory module according to the first type command in the first command queue. After performing the programming operation, the memory control circuit unit is further configured to transmit a response message corresponding to the second type command in the second command queue to the host system.

A memory control circuit unit for controlling a rewritable non-volatile memory module is provided according to an exemplary embodiment of the disclosure. The memory control circuit unit includes a host interface, a memory interface, a buffer memory and a memory management circuit. The host interface is configured to couple to a host system. The memory interface is configured to couple to the rewritable non-volatile memory module. The memory management circuit is coupled to the host interface, the memory interface and the buffer memory. The memory management circuit is configured to receive a first type command from the host system and temporarily store the first type command to a first command queue of the buffer memory. After receiving the first type command, the memory management circuit is further configured to receive a second type command from the host system and temporarily store the second type command to a second command queue of the buffer memory. If the first command queue meets a preset condition, the memory management circuit is further configured to transmit a write command sequence which instructs a programming operation for programming the rewriteable non-volatile memory module according to the first type command in the first command queue. After performing the programming operation, the memory management circuit is further configured to transmit a response message corresponding to the second type command in the second command queue to the host system.

Based on the above, the first type command and the second type command from the host system may be temporarily stored into the first command queue and the second command queue, respectively. If the first command queue meets the preset condition, the rewriteable non-volatile memory module may be programmed according to the data in the first command queue, and a response message corresponding to the second type command in the second command queue may be transmitted to the host system. Thereby, the write amplification of the memory storage device may be reduced and the life time of the memory storage device may be extended.

To make the above features and advantages of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
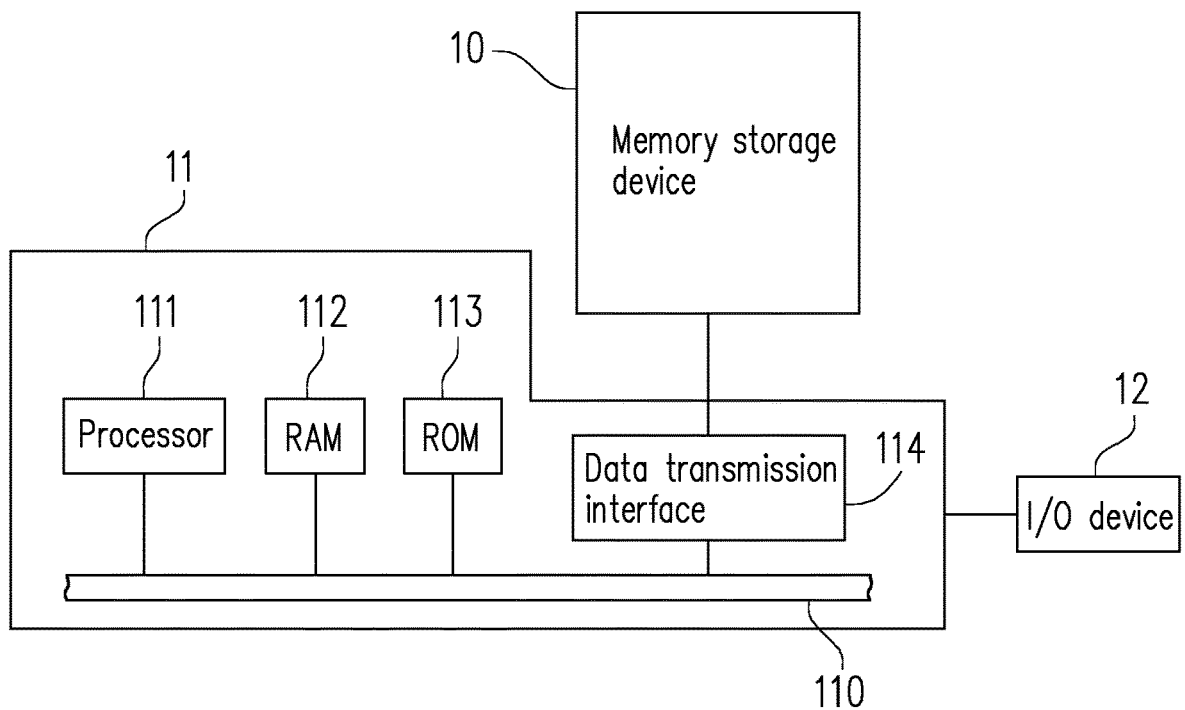
FIG. 1 is a schematic diagram illustrating a host system, a memory storage device and an I/O (input/output) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system may write data into the memory storage device or read data from the memory storage device.

Figure 2:
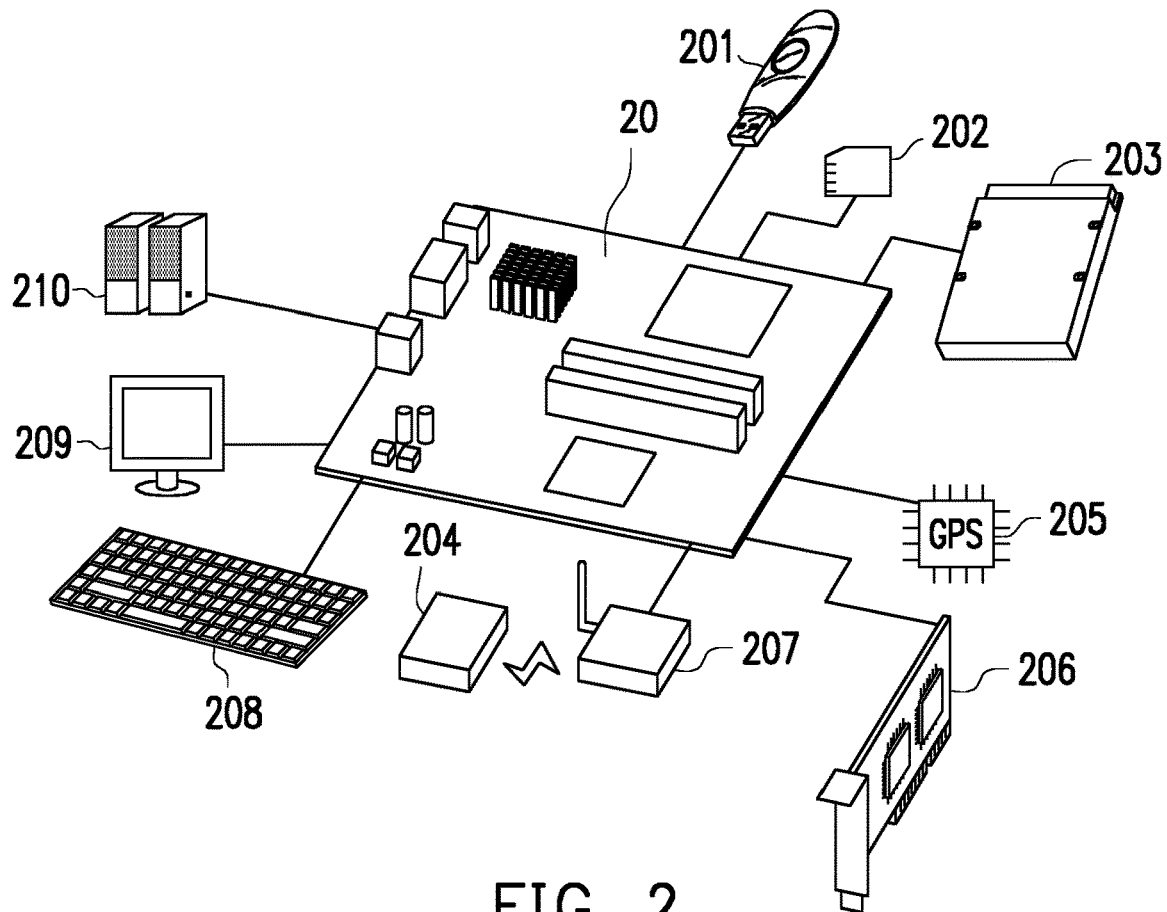
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 may store data into the memory storage device 10 or read data from the memory storage device 10 through the data transmission interface 114. Further, the host system 11 is coupled to an I/O device 12 via the system bus 110. For example, the host system 11 may transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 may access the wireless memory storage device 204 via the wireless transmission device 207.

Figure 3:
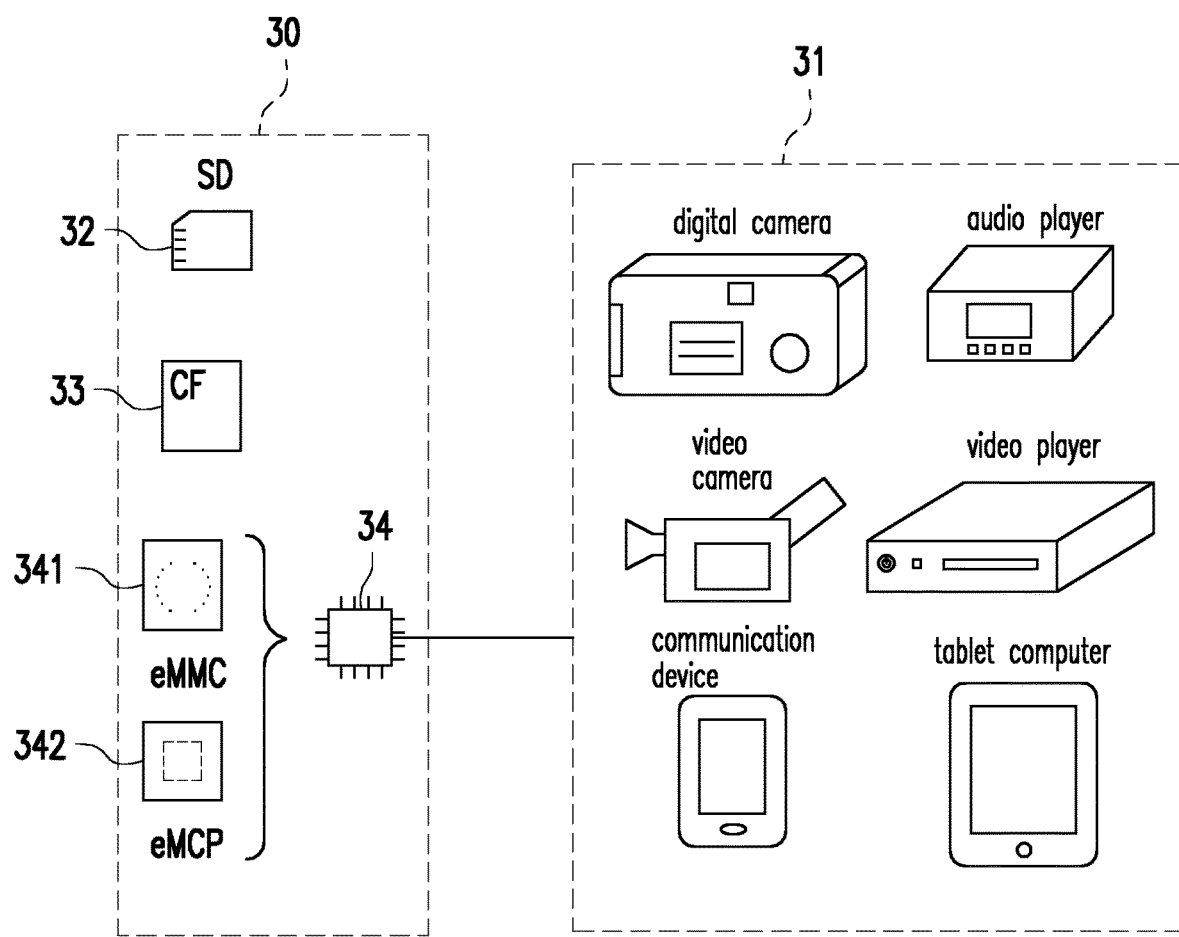
FIG. 3 is a schematic diagram illustrating a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system 31, such as an eMMC (embedded Multi Media Card) 341 and/or an eMCP (embedded Multi Chip Package) storage device 342.

Figure 4:
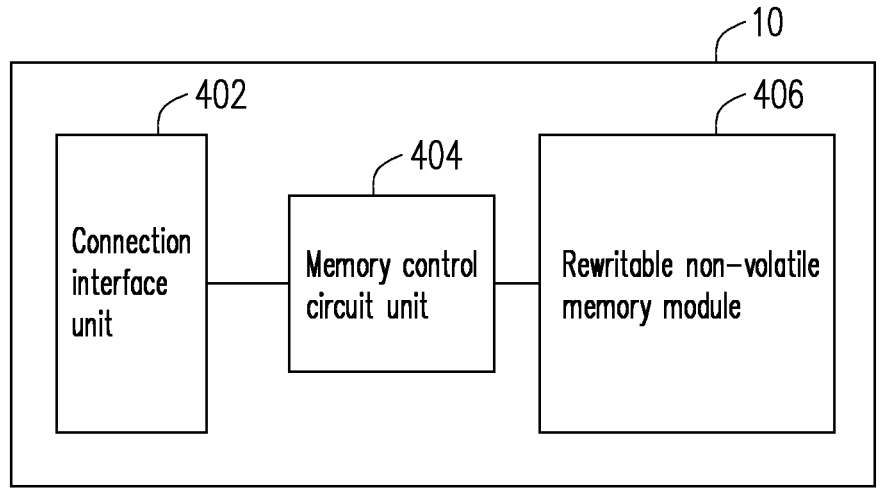
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple the memory storage device 10 to the host system 11. In the present exemplary embodiment, the connection interface unit 402 is compatible with a SATA (Serial Advanced Technology Attachment) standard. Nevertheless, it should be understood that the disclosure is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 406 may have a plurality of storage states. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more bits, the physical programming units on the same word line may be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is the minimum unit for programming. That is, the physical programming unit is the minimum unit for writing data. For example, the physical programming unit is a physical page or a physical sector. If the physical programming unit is the physical page, these physical programming units usually include a data bit area and a redundancy bit area. The data bit area includes multiple physical sectors configured to store user data, and the redundant bit area is configured to store system data (e.g., management data such as an error correcting code, etc.). In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
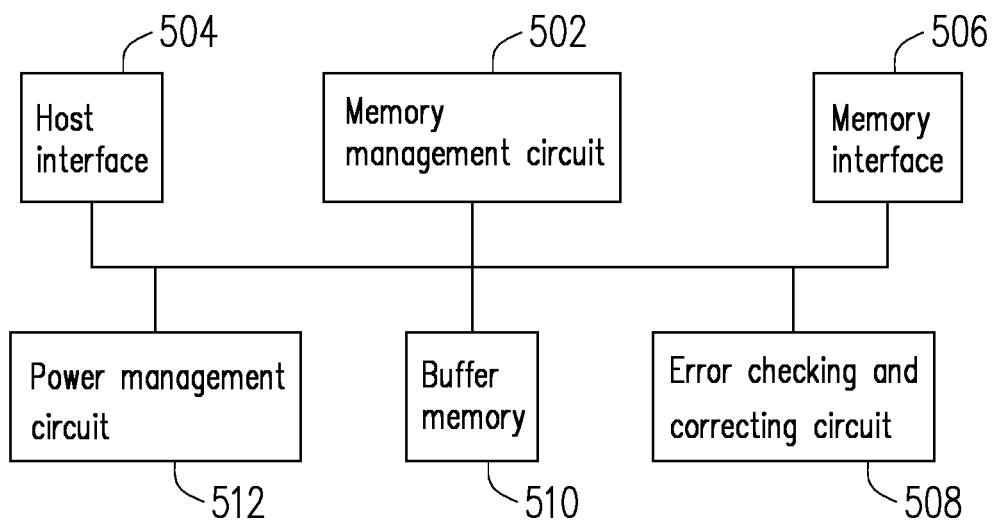
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory module dedicated for storing the system data) of the rewritable non-volatile memory module 406. In addition, the memory management circuit 502 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In this exemplary embodiment, the host interface 504 is compatible with the SATA standard. Nevertheless, it should be understood that the disclosure is not limited in this regard. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an command for writing data, the read command sequence as an command for reading data, the erase command sequence as an command for erasing data, and other corresponding command sequences as commands for performing various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data transmitted in the bus. The signals or the data may include command codes or program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives a write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

In an exemplary embodiment, the rewritable non-volatile memory module 406 of FIG. 4 may also be referred to as a flash memory module, the memory control circuit unit 404 of FIG. 4 may also be referred to as a flash memory controller for controlling the flash memory module, and/or the memory management circuit 502 of FIG. 5 may also be referred to as a flash memory management circuit.

Figure 6:
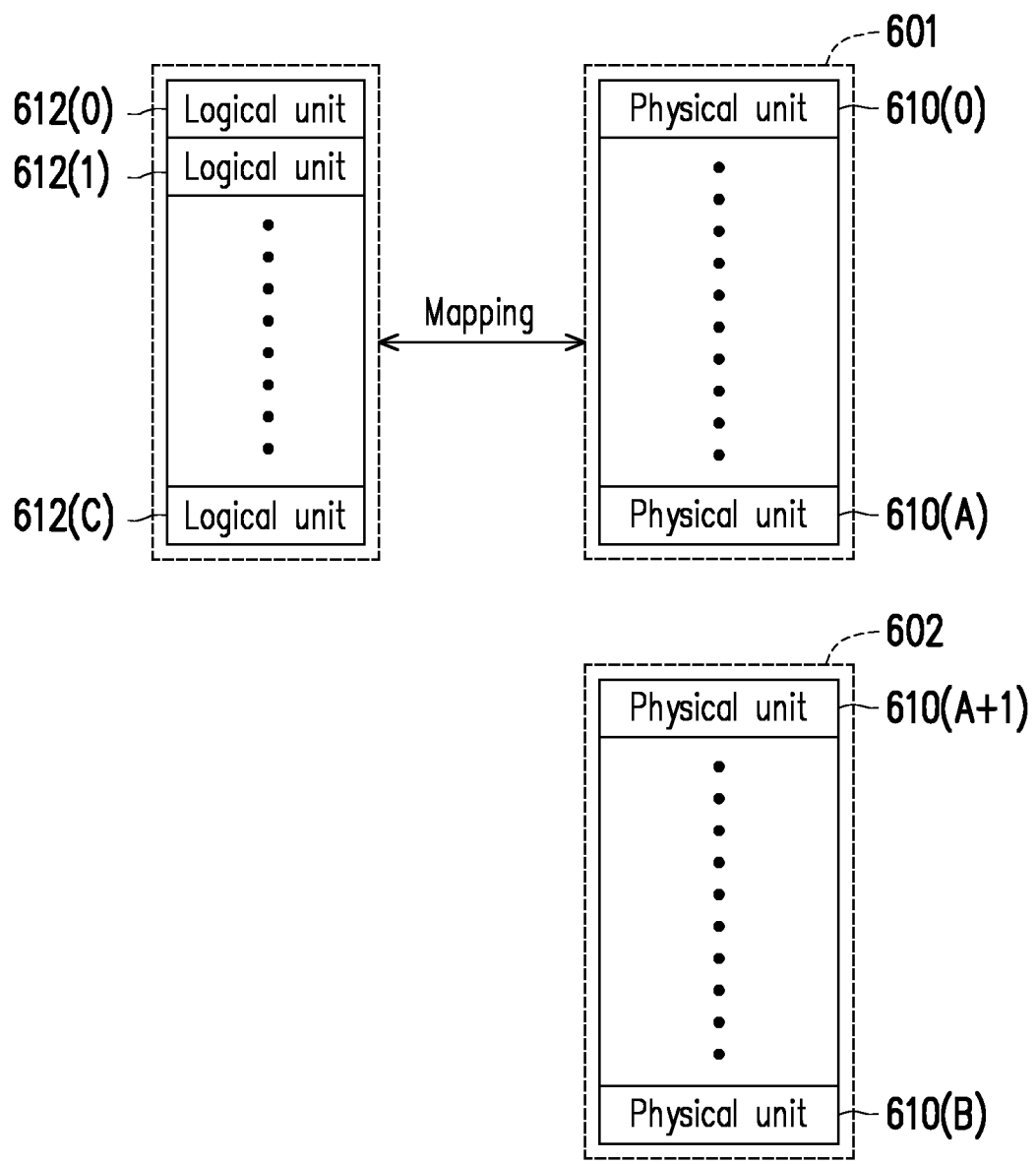
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure.

Referring to FIG. 6, the memory management circuit 502 logically groups physical units 610(0) to 610(B) of the rewritable non-volatile memory module 406 into a storage area 601 and a replacement area 602. The physical units 610(0) to 610(A) in the storage area 601 are configured to store data, and the physical units 610(A+1) to 610(B) in the replacement area 602 are configured to replace damaged physical units in the storage area 601. For example, if data read from one specific physical unit includes too many errors and these errors cannot be corrected, the specific physical unit is regarded as a damaged physical unit. It should be noted that, if there are no available physical erasing units in the replacement area 602, the memory management circuit 502 may declare the memory storage device 10 as in a write protect state so data can no longer be written thereto.

In the present exemplary embodiment, each physical unit refers to one physical programming unit. However, in another exemplary embodiment, one physical unit may also refer to one physical address, one physical erasing unit, or a composition of a plurality of continuous or discontinuous physical addresses. The memory management circuit 502 assigns logical units 612(0) to 612(C) for mapping to the physical units 610(0) to 610(A) in the storage area 601. In the present exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(C) may also be mapped to one or more physical units.

The memory management circuit 502 records a mapping relation (a.k.a. a logical-physical address mapping relation) between the logical units and the physical units into at least one logical-physical address mapping table. When the host system 11 intends to read the data from the memory storage device 10 or write the data into the memory storage device 10, the memory management circuit 502 may perform a data accessing operation on the memory storage device 10 according to the logical-physical address mapping table.

It is noted that in the following description, some terms may be replaced with corresponding abbreviations for ease of reading (see Table 1).

TABLE 1

| | |
|---|---|
| rewritable non-volatile memory module | RNVM module |
| memory management circuit | MMC |
| buffer memory | BM |
| command queue | CQ |

TABLE 1-continued

| | |
|---|---|
| first type command | FTC |
| second type command | STC |
| data management unit | DMU |

Figure 7:
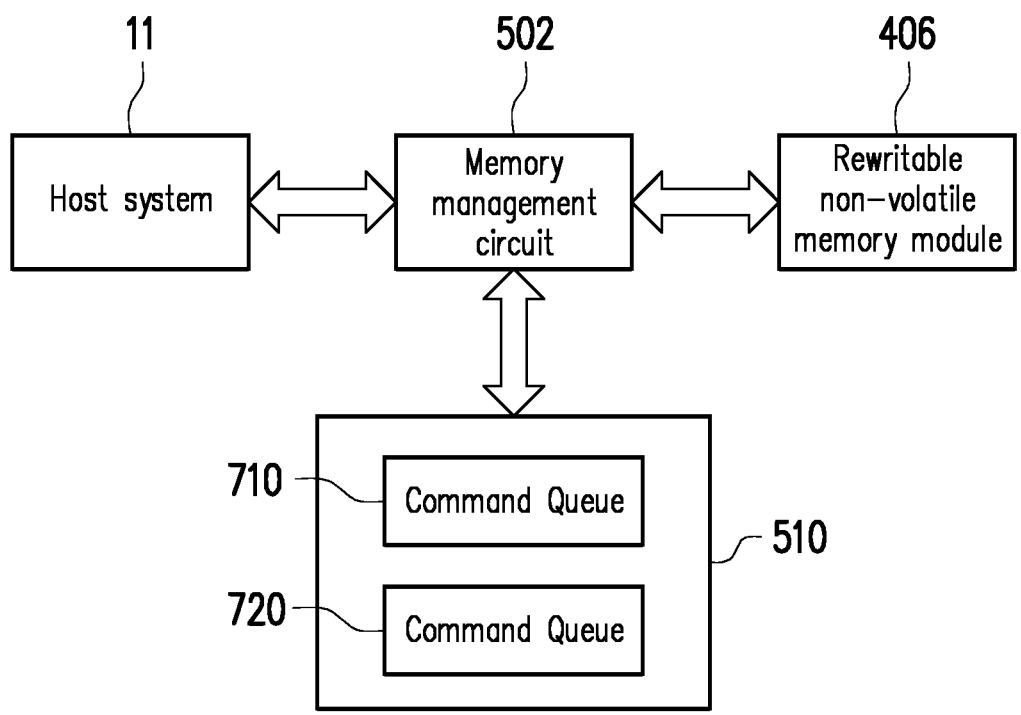
FIG. 7 is a schematic diagram illustrating a host system and a memory storage device according to an exemplary embodiment of the disclosure.

FIG. 7 is a schematic diagram illustrating a host system and a memory storage device according to an exemplary embodiment of the disclosure.

Referring to FIG. 7, in the exemplary embodiment, the MMC 502 configures a CQ (also referred to as a first CQ) 710 and a CQ (also referred to as a second CQ) 720 in the BM 510. The CQs 710 and 720 are independent from each other. However, in another exemplary embodiment, at least one of the CQs 710 and 720 may also be configured in the RNVM module 406 (e.g., a cache area or a buffer area in the RNVM module 406).

The MMC 502 receives a FTC and a STC from the host system 11. The FTC includes a write command. The STC includes at least one of a synchronous cache command, write Force Unit Access (FUA) command, and read FUA command. In an exemplary embodiment, the STC may indicate a storing of data in the BM 510 to the RNVM module 406. The MMC 502 temporarily stores the received FTC to the CQ 710 and temporarily stores the received STC to the CQ 720.

After the STC is received (or in response to the STC), the MMC 502 determines whether the CQ 710 meets a preset condition. If the CQ 710 meets the preset condition, the MMC 502 sends a write command sequence according to the data in the CQ 710 (e.g., the FTC). The write command sequence is configured to instruct a programming operation for programming the RNVM module 406 according to the data in the CQ 710 (e.g., the FTC). After the programming operation is performed, the MMC 502 transmits a response message corresponding to at least one STC in the CQ 720 to the host system 11. However, if the CQ 710 does not meet the preset condition, the MMC 502 may maintain the FTC in the CQ 710, and the MMC 502 may not execute the corresponding program operation in response to the received STC. Comparing to tradition that the corresponding programming is performed when each time the STC is received, an exemplary embodiment of the present disclosure may effectively reduce the write amplification of data and reduce the number of accesses to the memory storage device.

In an exemplary embodiment, the MMC 502 may determine whether the data, to be stored, in the CQ 710 meets a DMU. If the data, to be stored, in the CQ 710 meets the DMU, the MMC 502 may determine that the CQ 710 meets the preset condition. However, if the data, to be stored, in the CQ 710 does not meet to the DMU, the MMC 502 may determine that the CQ 710 does not meet the preset condition.

In an exemplary embodiment, the MMC 502 may determine whether the data amount of the data, to be stored, in the CQ 710 is not less than (i.e., greater than or equal to) the data amount of one DMU. If the data amount of the data, to be stored, in the CQ 710 is not less than the data amount of one DMU, the MMC 502 may determine that the data, to be stored, in the CQ 710 meets the DMU. However, if the data amount of the data, to be stored, in the CQ 710 is less than the data amount of one DMU, the MMC 502 may determine that the data, to be stored, in the CQ 710 does not meet the DMU.

In an exemplary embodiment, one DMU refers to one physical unit (for example, any of the physical unit 610(0) to 610(A) of FIG. 6), and the data amount of a physical unit is 16 KB. However, in another exemplary embodiment, the data amount of one DMU may be more or less.

FIG. 8A to FIG. 8F are schematic diagrams illustrating memory management operations according to an exemplary embodiment of the disclosure.

Figure 8A:
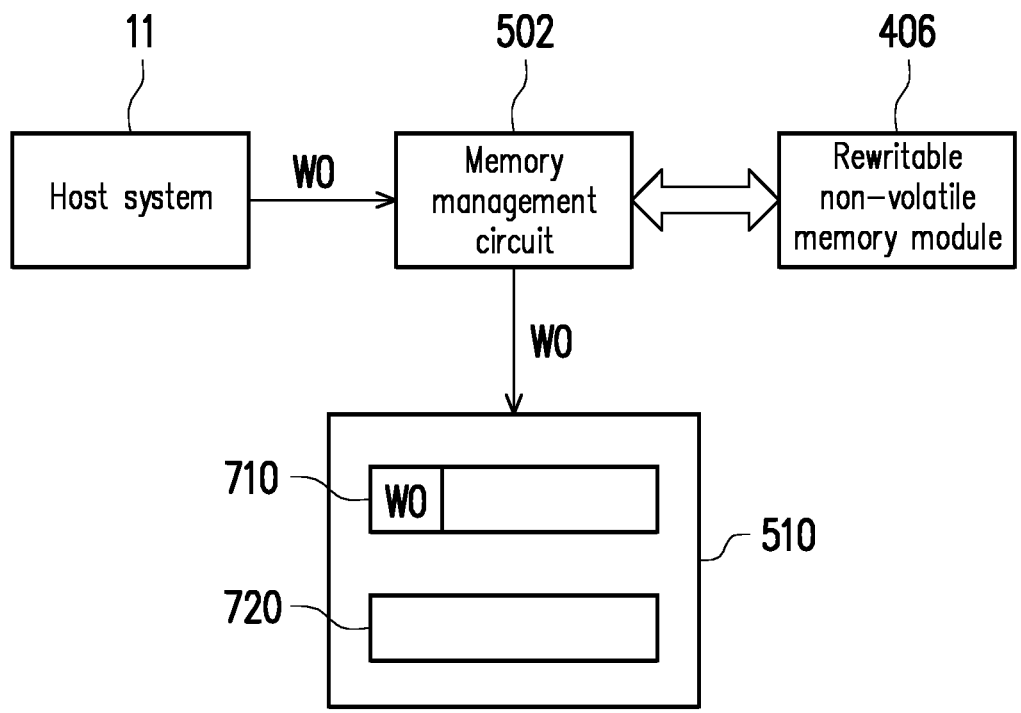
FIG. 8A to FIG. 8F are schematic diagrams illustrating memory management operations according to an exemplary embodiment of the disclosure.

Referring to FIG. 8A, the MMC 502 may receive a command W0 from the host system 11. The command W0 is the FTC, for example, a write command. The MMC 502 may temporarily store the command W0 (including data indicated to be stored by the command W0) to the CQ 710.

Figure 8B:
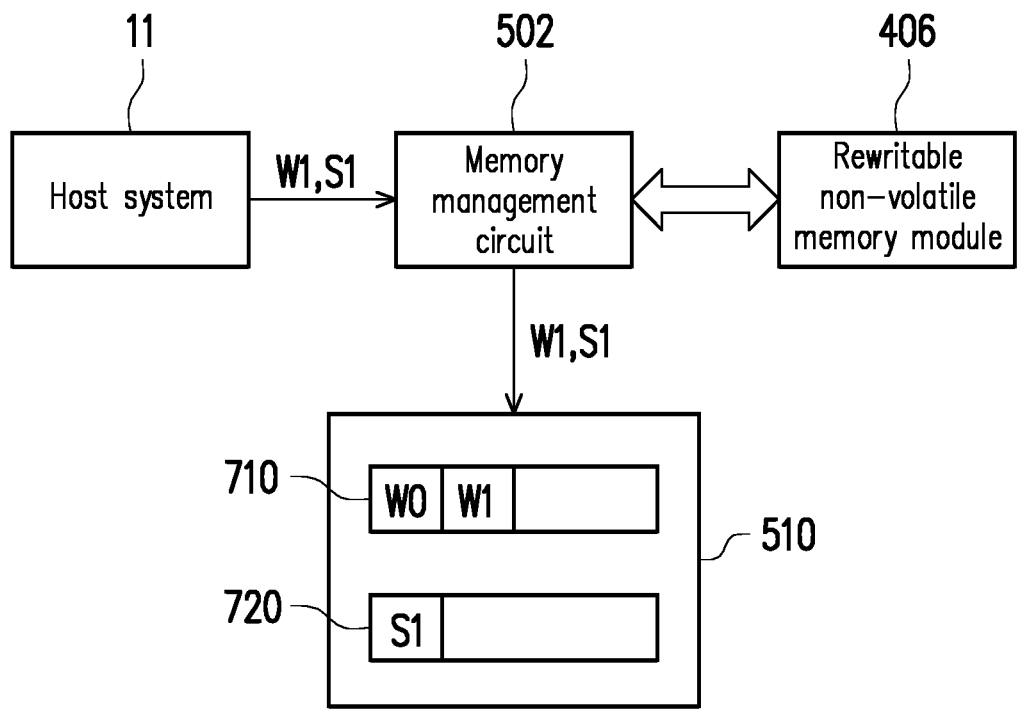

Referring to FIG. 8B, after the command W0 is temporarily stored to the CQ 710, the MMC 502 may receive a command W1 from the host system 11. The command W1 is the FTC, such as a write command. After receiving the command W1, the MMC 502 may receive a command S1 from host system 11. The command S1 is the STC. For example, the command S1 may be one of a synchronous cache command, a write FUA command, and a read FUA command. The MMC 502 may temporarily store the command W1 (including the data indicated to be stored by the command W1) to the CQ 710 and temporarily store the command S1 to the CQ 720. Then, in response to the command S1, the MMC 502 may determine whether the CQ 710 meets the preset condition.

In the exemplary embodiment of FIG. 8B, the sum of the data amounts of the data indicated to be stored by the commands W0 and W1 is less than the data amount of one DMU. Therefore, the MMC 502 may determine that the CQ 710 does not meet the preset condition, and the data indicated to be stored by the commands W0 and W1 is not written into the RNVM module 406.

Figure 8C:
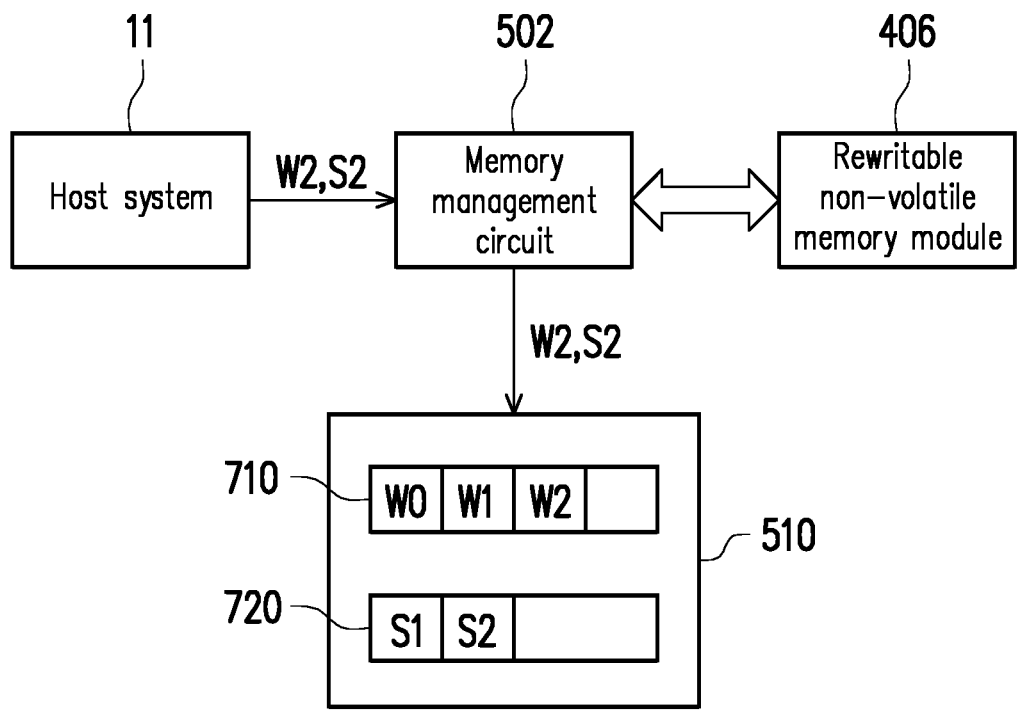

Referring to FIG. 8C, the MMC 502 may receive a command W2 from the host system 11 after temporarily storing the commands W1 and S1 to the CQ 710 and 720, respectively. The command W2 is the FTC, such as a write command. After receiving the command W2, the MMC 502 may receive a command S2 from host system 11. The command S2 is the STC. For example, command S2 may be one of a synchronous cache command, a write FUA command, and a read FUA command. The MMC 502 may temporarily store the command W2 (including the data indicated to be stored by the command W2) to the CQ 710 and temporarily store the command S2 to the CQ 720. Then, the MMC 502 may determine whether the CQ 710 meets the preset condition.

In the exemplary embodiment of FIG. 8C, the sum of the data amounts of the data indicated to be stored by the commands W0, W1, and W2 is less than the data amount of one DMU. Therefore, the MMC 502 may determine that the CQ 710 does not meet the preset condition, and the data indicated to be stored by the commands W0, W1, and W2 is not written into the RNVM module 406.

Figure 8D:
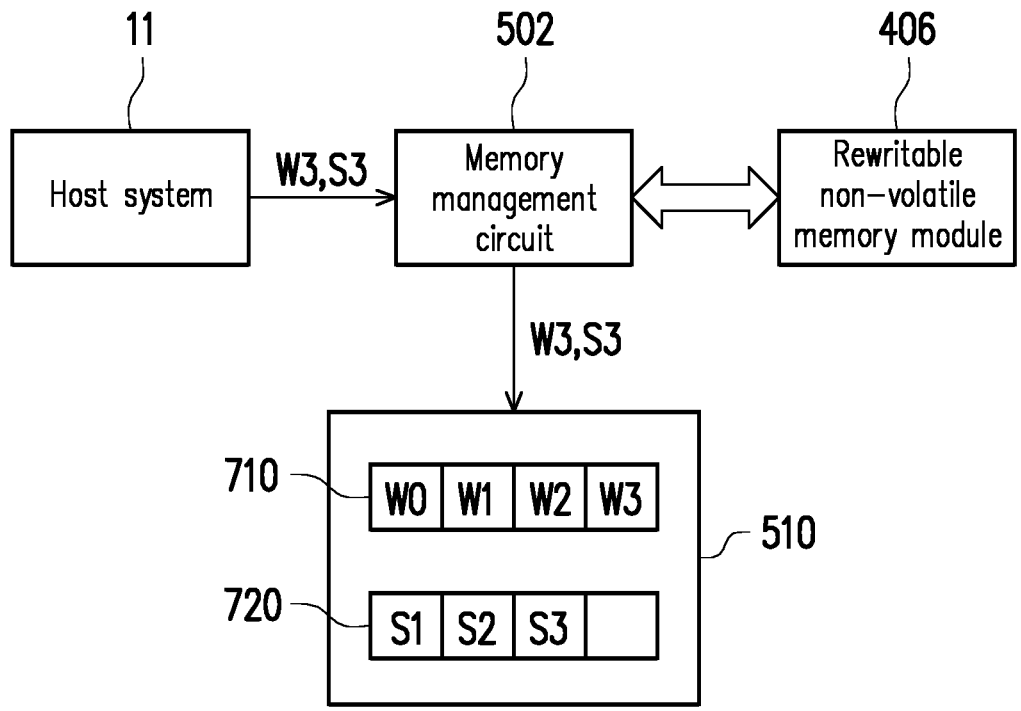

Referring to FIG. 8D, after the command W2 and S2 are temporarily stored to the CQ 710 and 720, respectively, the MMC 502 may receive a command W3 from the host system 11. The command W3 is the FTC, such as a write command. After receiving the command W3, MMC 502 may receive a command S3 from host system 11. The command S3 is the STC. For example, the command S3 may be one of a synchronous cache command, a write FUA command, and a read FUA command. The MMC 502 may temporarily store the command W3 (including data indicated to be stored by the command W3) to the CQ 710 and temporarily store the command S3 to the CQ 720. Then, the MMC 502 may determine whether the CQ 710 meets the preset condition. For example, it is assumed that the sum of the data amounts of the data indicated to be stored by the commands W0-W3 is 16 KB, which is not less than the data amount of one DMU, therefore, the MMC 502 may determine that the CQ 710 meets the preset condition.

Figure 8E:
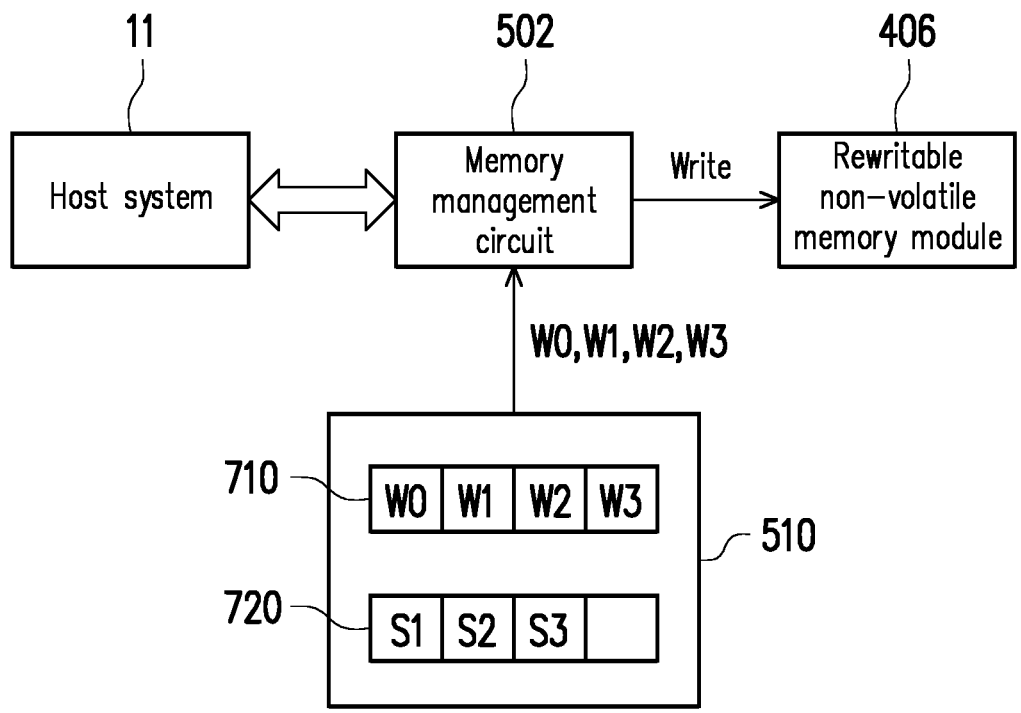

Referring to FIG. 8E, after determining that the CQ 710 meets the preset condition, the MMC 502 may read the commands W0-W3 from the CQ 710. Then, the MMC 502 may send a write command sequence according to the commands W0-W3 to instruct a writing of the data indicated by the commands W0-W3 into the RNVM module 406. For example, the data indicated to be stored by the commands W0-W3 is written to the same physical unit (e.g., the physical unit 610(0) of FIG. 6).

Figure 8F:
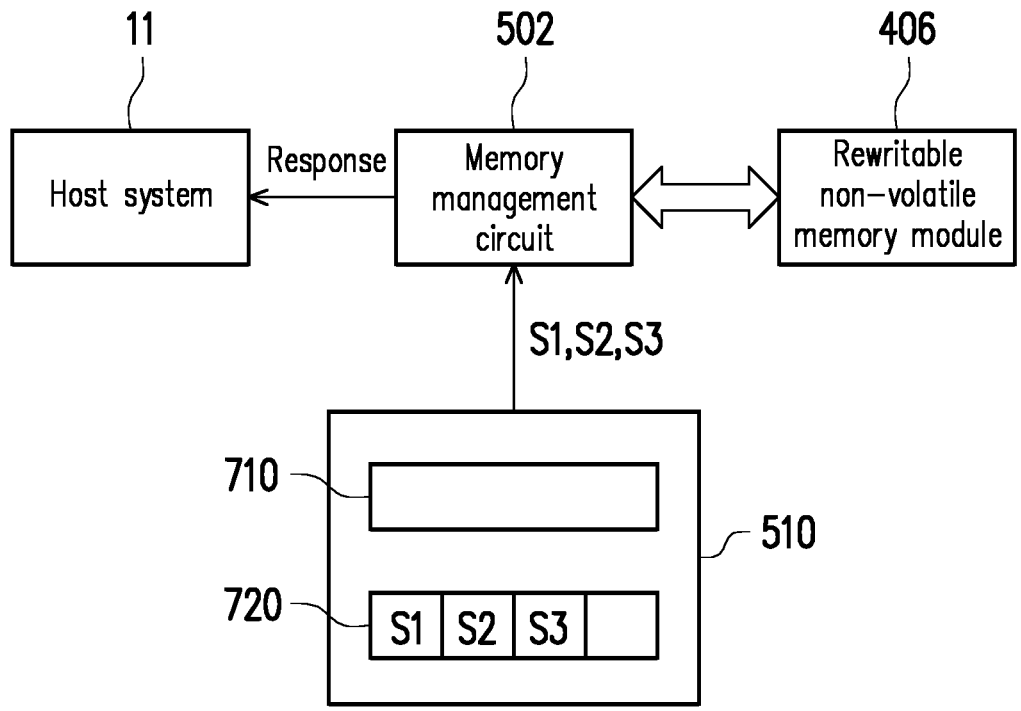

Referring to FIG. 8F, after the data indicated by commands W0-W3 is written to the RNVM module 406, the MMC 502 may clear the CQ 710. In addition, in response to that the data indicated to be stored by the commands W0-W3 (or the data, to be stored, in the BM 510) has been stored to the RNVM module 406, the MMC 502 may transmit a response message corresponding to the commands S1-S3 to the host system 11. This response message may inform the host system 11 that the data access operation corresponding to the commands S1-S3 has been completed. After transmitting the response message corresponding to the commands S1-S3 to host system 11, the MMC 502 may also clear the CQ 720.

In an exemplary embodiment, the MMC 502 may activate a counter (also referred to as a first counter). After a count value of the first counter meets a certain count value (also referred to as the first count value), the MMC 502 may temporarily store dummy data to the CQ 710. That is, after a STC is received, if a next FTC is not received within a preset time range, then the dummy data is used to fill a part of the storage space in the CQ 710. In an exemplary embodiment, once the dummy data or the FTC is stored into the CQ 710, the count value of the first counter may be reset.

FIG. 9A to FIG. 9D are schematic diagrams illustrating memory management operations according to an exemplary embodiment of the disclosure. It is noted that the exemplary embodiments of FIGS. 9A-9D are, for example, continued from the exemplary embodiment of FIG. 8B.

Figure 9A:
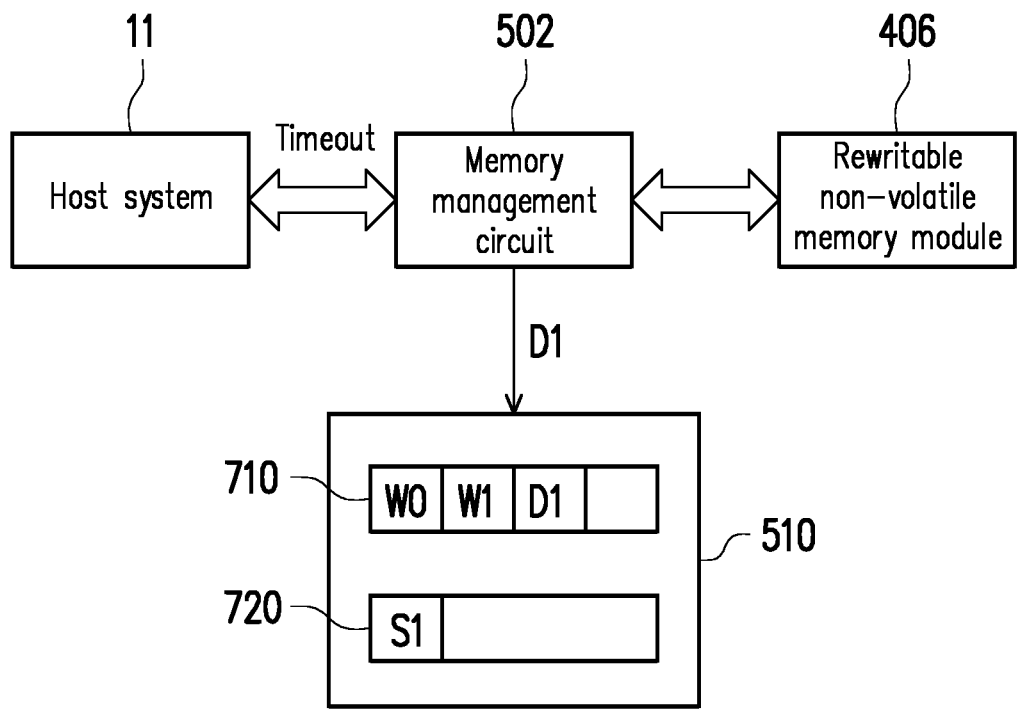
FIG. 9A to FIG. 9D are schematic diagrams illustrating memory management operations according to an exemplary embodiment of the disclosure.

Referring to FIG. 9A, after the command S1 is received, the MMC 502 may activate the first counter. Alternatively, from another perspective, the first counter may be activated in response to the command S1. After the first counter is activated, if the count value of the first counter meets the first count value and a new FTC is not received during the counting period, the MMC 502 may temporarily store the dummy data D1 to the CQ 710. The dummy data D1 is meaningless data or invalid data generated by the MMC 502.

Figure 9B:
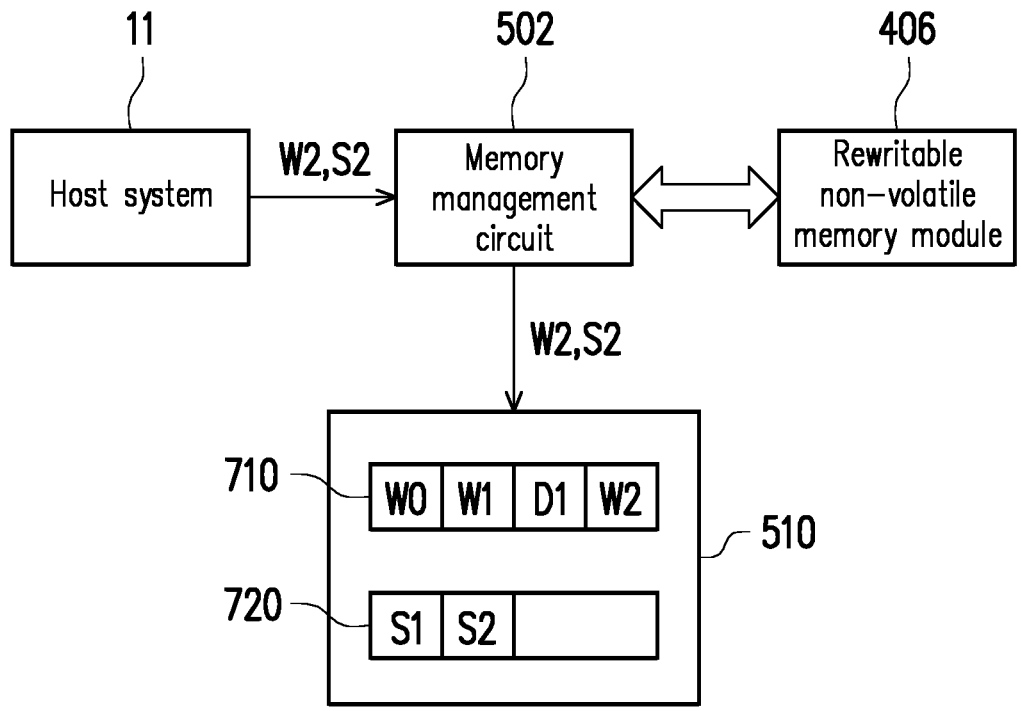

Referring to FIG. 9B, after the dummy data D1 is temporarily stored into the CQ 710, the MMC 502 may receive a command W2 from the host system 11. The command W2 is the FTC, such as a write command. After receiving the command W2, the MMC 502 may receive a command S2 from host system 11. The command S2 is the STC. For example, command S2 may be one of a synchronous cache command, a write FUA command, and a read FUA command. The MMC 502 may temporarily store the command W2 (including data indicated to be stored by the command W2) to the CQ 710 and temporarily store the command S2 to the CQ 720. Then, the MMC 502 may determine whether the CQ 710 meets the preset condition. For example, the MMC 502 may determine whether the sum of the data amounts of the data indicated to be stored by the commands W0-W2 and the data amount of the dummy data D1 is not less than the data amount of one DMU.

In the exemplary embodiment of FIG. 9B, it is assumed that the sum of the data amounts of the data indicated to be stored by the commands W0-W2 and the data amount of the dummy data D1 is not less than the data amount of one DMU. Therefore, the MMC 502 may determine that the CQ 710 meets the preset condition.

Figure 9C:
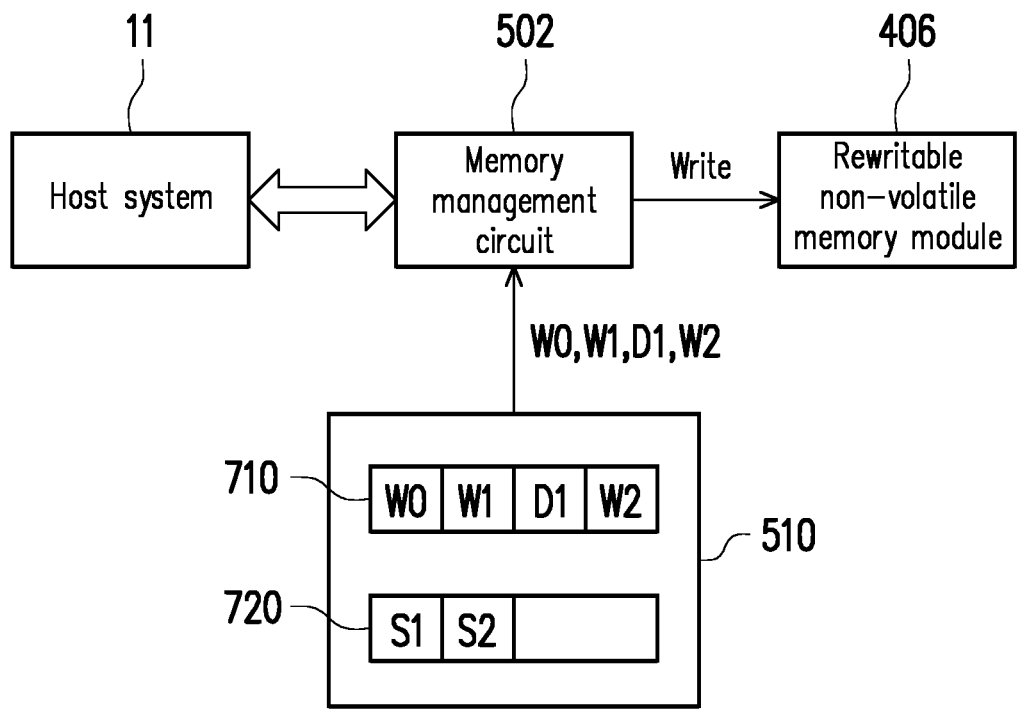

Referring to FIG. 9C, after determining that the CQ 710 meets the preset condition, the MMC 502 may read the commands W0-W2 and the dummy data D1 from the CQ 710. Then, the MMC 502 may send a write command sequence according to the commands W0-W2 and the dummy data D1 to instruct a writing of the data indicated to be stored by the commands W0-W2 and the dummy data D1 into the RNVM module 406. For example, the data indicated to be stored by the commands W0-W2 and the dummy data D1 are written to the same physical unit (for example, the physical unit 610(0) of FIG. 6).

Figure 9D:
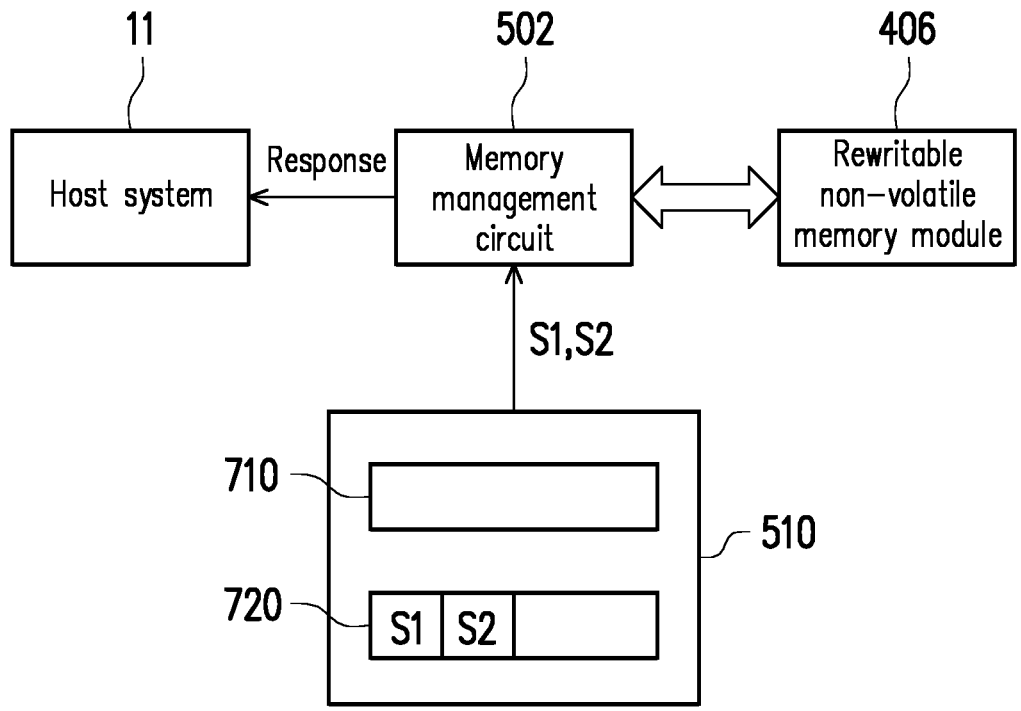

Referring to FIG. 9D, after the data indicated by the commands W0-W2 and the dummy data D1 is written to the RNVM module 406, the MMC 502 may clear the CQ 710. In addition, in response to that the data indicated to be stored by the commands W0-W2 (or the data in the BM 510) is stored to the RNVM module 406, the MMC 502 may transmit a response message corresponding to the commands S1 and S2 to the host system 11. This response message may informs the host system 11 that the data access operation corresponding to commands S1 and S2 has been completed. After transmitting the response message corresponding to commands S1 and S2 to the host system 11, the MMC 502 may clear the CQ 720.

In an exemplary embodiment, MMC 502 may activate another counter (also referred to as a second counter). After the count value of the second counter meets a count value (also referred to as a second count value), the MMC 502 may program the RNVM module 406 according to the data in the CQ 710 (e.g., the FTC and/or the dummy data) to avoid a response timeout. In other words, after receiving a STC, if the CQ 710 still does not meet the preset condition at a time point that the response timeout is about to occur, the MMC 502 may directly store the data in the BM 510 to the RNVM module 406, and a response message corresponding to this STC may be sent to the host system 11 to avoid the response timeout. In an exemplary embodiment, the second count value is greater than the first count value. For example, the second count value may be N times the first count value. N may be, for example, 4 or other numerical values.

Figure 10A:
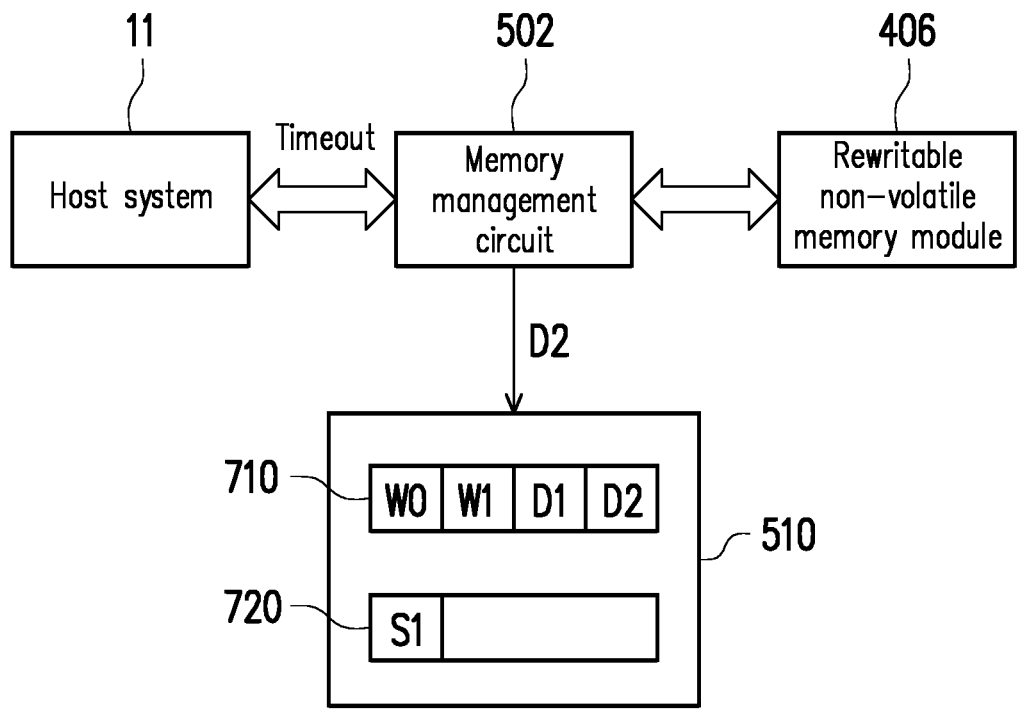
FIG. 10A to FIG. 10C are schematic diagrams illustrating memory management operations according to an exemplary embodiment of the disclosure.
Figure 10B:
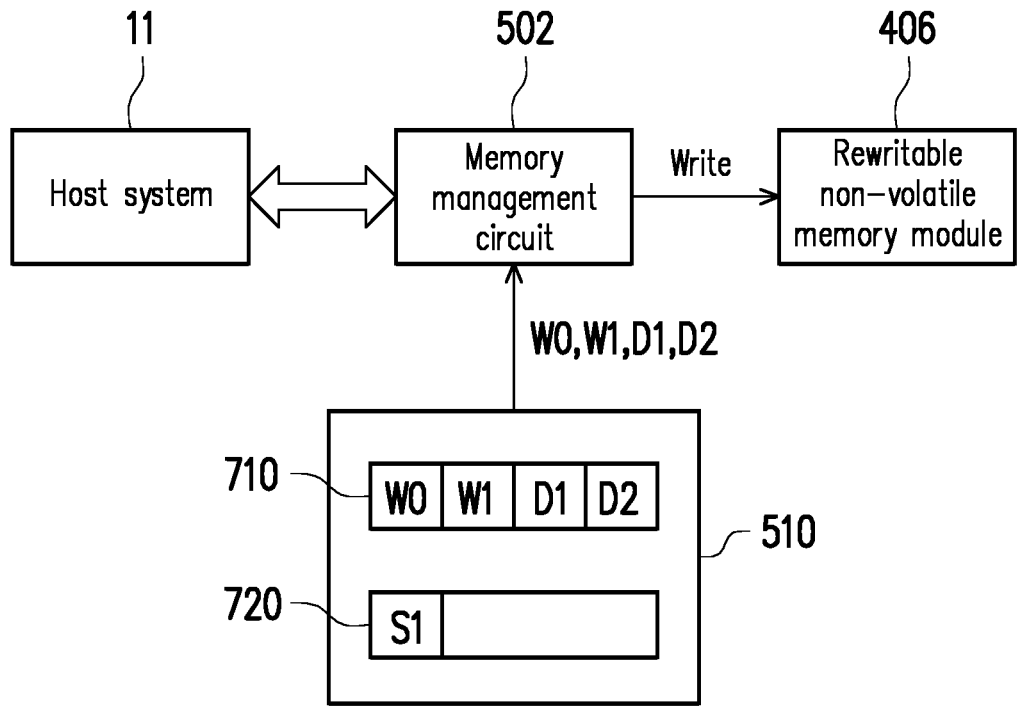
Figure 10C:
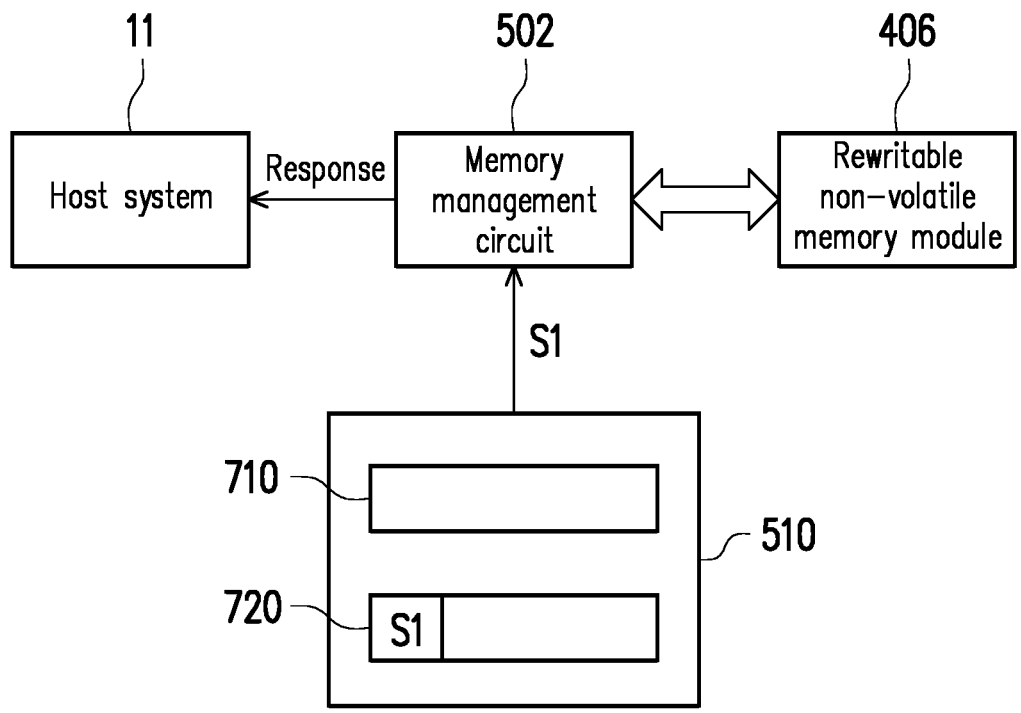

FIG. 10A to FIG. 10C are schematic diagrams illustrating memory management operations according to an exemplary embodiment of the disclosure. It is noted that the exemplary embodiments of FIGS. 10A to 10C are, for example, continued from the exemplary embodiment of FIG. 9A.

Referring to FIG. 10A, after the dummy data D1 is temporarily stored in the CQ 710, if the count value of the first counter meets the first count value again and a new FTC is not received during the counting period, the MMC 502 may further temporarily store dummy data D2 to the CQ 710.

Referring to FIG. 10B, it is assumed that the second counter is activated in response to the command S1. After activating the second counter, if the count value of the second counter meets the second count value, the MMC 502 may send a write command sequence which instructs a writing of the data indicated by the commands W0 and W1 and the dummy data D1 and D2 into the RNVM module 406 according to the commands W0 and W1 and the dummy data D1 and D2. For example, the data indicated to be stored by the commands W0 and W1 and the dummy data D1 and D2 is written to the same physical unit (for example, the physical unit 610(0) of FIG. 6).

It is noted that in another exemplary embodiment of FIG. 10B, the second counter may not be configured or set. The MMC 502 may send a write command sequence which indicates a writing of the data indicated to be stored by the commands W0 and W1 and the dummy data D1 and D2 into the RNVM module 406 in response to that the CQ 710 meets the preset condition.

Referring to FIG. 10C, after the data indicated by the commands W1 and W1 and the dummy data D1 and D2 is written to the RNVM module 406, the MMC 502 may clear the CQ 710. In addition, in response to that data indicated by the commands W0 and W1 (or the data in the BM 510) has been stored to the RNVM module 406, the MMC 502 may transmit a response message corresponding to the command S1 to the host system 11. This response message may inform the host system 11 that the data access operation corresponding to the command S1 is completed. After transmitting the response message corresponding to the command S1 to the host system 11, the MMC 502 may clear the CQ 720.

In an exemplary embodiment, the MMC 502 may record association information according to the received STC and the received FTC. The association information is configured to associate the STC in the CQ 720 with the FTC in the CQ 710.

Figure 11:
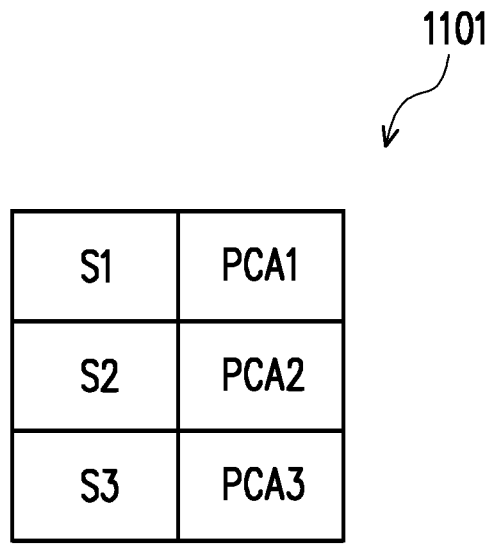
FIG. 11 is a schematic diagram illustrating association information according to an exemplary embodiment of the disclosure.

FIG. 11 is a schematic diagram illustrating association information according to an exemplary embodiment of the disclosure.

Referring to FIG. 8E, FIG. 8F and FIG. 11, the MMC 502 may record the association information 1101 according to the commands S1-S3 in the CQ 720 and the commands W1-W3 in the CQ 710. For example, the association information 1101 may also be stored in the BM 510. Association information 1101 may reflect a physical cache address PCA1 of the command W1 in the CQ 710 corresponding to the command S1, a physical cache address PCA2 of the command W2 in the CQ 710 corresponding to the command S2, and a physical cache address PCA3 of the command W3 in the CQ 710 corresponding to the command S3.

According to the association information 1101, the MMC 502 may obtain a receiving order of the STC in the CQ 720 and the FTC in the CQ 710. For example, according to the association information 1101, the MMC 502 may obtain that the command S1 is received after the command W1, the command S2 is received after the command W2, and the command S3 is received after the command W3. In addition, according to the association information 1101, the MMC 502 may also notify the host system 11 by the response message that, in response to the commands S1-S3, the data corresponding to the commands W1-W3 (or the physical cache address PCA1-PCA3) is stored to the RNVM module 406.

It is noted that the data format of the association information 1101 of FIG. 11 is merely an example. In another exemplary embodiment, the association information 1101 may also use other data formats and/or store other useful data, and the present disclosure is not limited thereto.

Figure 12:
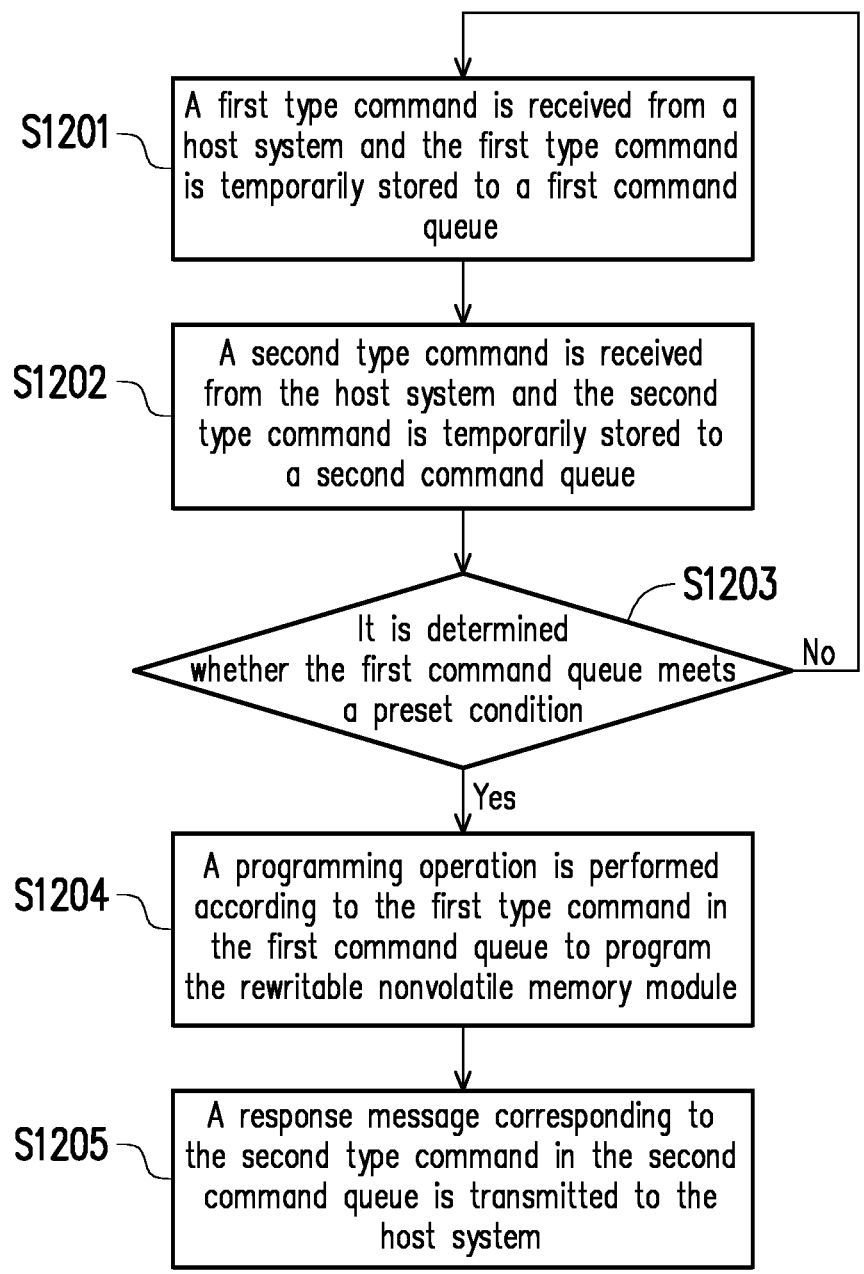
FIG. 12 is a flow chart of a memory management method according to an exemplary embodiment of the disclosure.

FIG. 12 is a flow chart of a memory management method according to an exemplary embodiment of the disclosure.

Referring to FIG. 12, in step S1201, a FTC is received from a host system and the FTC is temporarily stored to a first CQ. After receiving the FTC, in step S1202, a STC is received from the host system and the STC is temporarily stored to a second CQ. In step S1203, it is determined whether the first CQ meets a preset condition. If the first CQ meets the preset condition, in step S1204, a programming operation is performed according to the FTC in the first CQ to program a RNVM module. After performing the programming operation, in step S1205, a response message corresponding to the STC in the second CQ is transmitted to the host system. In addition, if it is determined that the first CQ does not meet the preset condition, after step S1203, step S1201 (or S1202) may be repeated.

Figure 13:
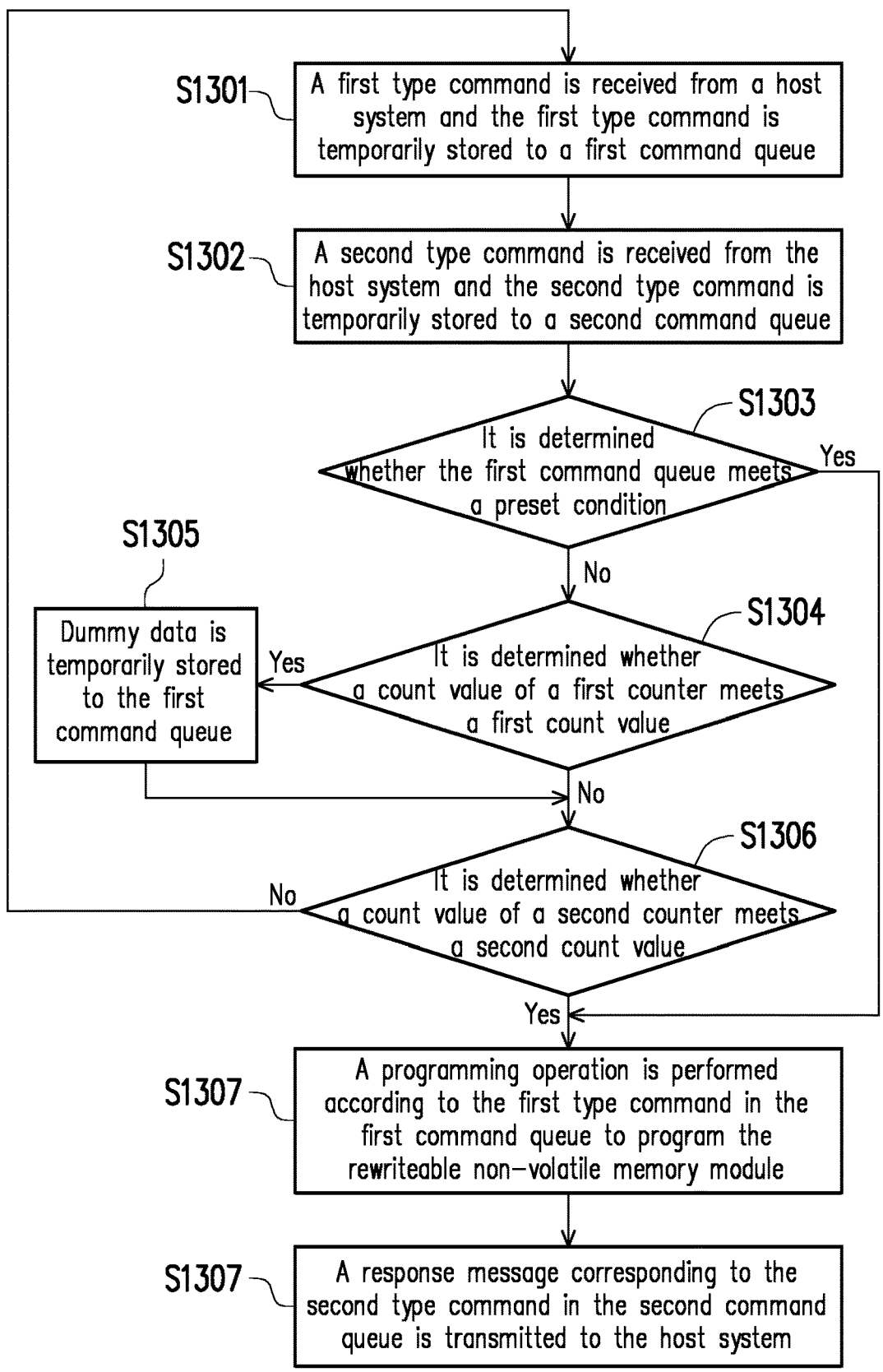
FIG. 13 is a flow chart of a memory management method according to an exemplary embodiment of the disclosure.

FIG. 13 is a flow chart of a memory management method according to an exemplary embodiment of the disclosure.

Referring to FIG. 13, in step S1301, a FTC is received from a host system and the FTC is temporarily stored to a first CQ. After receiving the FTC, in step S1302, a STC is received from the host system and the STC is temporarily stored to a second CQ. In step S1303, it is determined whether the first CQ meets a preset condition. If the first CQ meets the preset condition, in step S1307, a programming operation is performed according to the FTC in the first CQ (or may include dummy data) to program the RNVM module.

If it is determined that the first CQ does not meet the preset condition, in step S1304, it is determined whether a count value of a first counter meets a first count value. If the count value of the first counter meets the first count value, indicating that a new FTC is not received during the counting period. As such, in step S1305, dummy data is temporarily stored to the first CQ. If the count value of the first counter does not meet the first count value, in step S1306, it is determined whether a count value of a second counter meets a second count value. If the count value of the second counter meets the second count value, indicating that the response timeout is about to occur, step S1307 may be directly entered. If the count value of the second counter does not meet the second count value, after step S1306, it may return to step S1301 (or S1302). In addition, after step S1307, step S1308 may be executed to transmit a response message corresponding to the STC in the second CQ to the host system.

It is noted that, in another exemplary embodiment of FIG. 13, the execution order of steps S1303, S1304, and S1306 may be adjusted, for example, the determination of step S1304 is performed first, then the determination of step S1303 is performed, and the like, and the present disclosure is not limited. Alternatively, in an exemplary embodiment, the second counter may not be used and only the first counter is used for timeout detection and for the addition of the dummy data. In an exemplary embodiment in which the second counter is not used, after step S1304, step S1301 (or S1302) may be performed without performing step S1306.

However, the steps in FIGS. 12 and 13 have been described in detail above, and will not be described again. It should be noted that the steps in FIG. 12 and FIG. 13 may be implemented as multiple programming codes or circuits, and the present disclosure is not limited. In addition, the methods of FIG. 12 and FIG. 13 may be used in combination with the above exemplary embodiments, or may be used alone, and the present disclosure is not limited.

In summary, the exemplary embodiments of the present disclosure may temporarily store the FTC and the STC from the host system into the first CQ and the second CQ, respectively. If the first CQ meets the preset condition or the response timeout is about to occur, the RNVM module is programmed according to the data in the first CQ (e.g., the FTC and/or the dummy data), and a response message corresponding to the STC in the second CQ is transmitted to the host system. Thereby, the write amplification of the memory storage device may be reduced and the life time of the memory storage device may be extended, and the performance of the memory storage device may be effectively improved.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory management method for a rewriteable non-volatile memory module, the memory management method comprising:
    receiving a first type command from a host system and temporarily storing the first type command to a first command queue;
    after receiving the first type command, receiving a second type command from the host system and temporarily storing the second type command to a second command queue;
    if the first command queue meets a preset condition, performing a programming operation according to the first type command in the first command queue to program the rewriteable non-volatile memory module;
    if the first command queue does not meet the preset condition, maintaining the second type command in the second command queue and not executing the second type command until the first command queue meets the preset condition; and
    after performing the programming operation, transmitting a response message corresponding to the second type command in the second command queue to the host system,
    wherein the second type command indicates a storing of data in a buffer memory comprising the first command queue to the rewriteable non-volatile memory module.

2. The memory management method of claim 1, further comprising:
    recording association information, wherein the association information is configured to associate the second type command in the second command queue with the first type command in the first command queue.

3. The memory management method of claim 1, further comprising:
    if the amount of data, to be stored, in the first command queue meets the amount of data of one data management unit, determining that the first command queue meets the preset condition.

4. The memory management method of claim 1, further comprising:
    activating a first counter; and
    after a count value of the first counter meets a first count value, storing dummy data into the first command queue temporarily.

5. The memory management method of claim 4, wherein the step of performing the programming operation according to the first type command in the first command queue comprises:
    performing the programming operation according to the first type command and the dummy data in the first command queue.

6. The memory management method of claim 1, further comprising:
  activating a second counter; and
    if a count value of the second counter meets a second count value, performing the programming operation according to the first type command in the first command queue.

7. The memory management method of claim 1, further comprising:
  if the first command queue does not meet the preset condition, maintaining the first type command in the first command queue, and temporarily not performing the programming operation in response to the second type command.

8. The memory management method of claim 1, wherein the first type command comprises a write command, and the second type command comprises one of a synchronous cache command, a write force unit access command and a read force unit access command.

9. A memory storage device, comprising:
  a connection interface unit, configured to couple to a host system;
  a rewritable non-volatile memory module; and
  a memory control circuit unit, coupled to the connection interface unit and the rewritable non-volatile memory module,
  wherein the memory control circuit unit is configured to receive a first type command from the host system and temporarily store the first type command to a first command queue,
  after receiving the first type command, the memory control circuit unit is further configured to receive a second type command from the host system and temporarily store the second type command to a second command queue,
  if the first command queue meets a preset condition, the memory control circuit unit is further configured to transmit a write command sequence which instructs a programming operation for programming the rewriteable non-volatile memory module according to the first type command in the first command queue,
  if the first command queue does not meet the preset condition, the memory control circuit unit is further configured to maintain the second type command in the second command queue and not to execute the second type command until the first command queue meets the preset condition, and
  after performing the programming operation, the memory control circuit unit is further configured to transmit a response message corresponding to the second type command in the second command queue to the host system,
  wherein the second type command indicates a storing of data in a buffer memory comprising the first command queue to the rewriteable non-volatile memory module.

10. The memory storage device of claim 9, wherein the memory control circuit unit is further configured to record association information, wherein the association information is configured to associate the second type command in the second command queue with the first type command in the first command queue.

11. The memory storage device of claim 9, wherein the memory control circuit unit is further configured to determine that the first command queue meets the preset condition if the amount of data, to be stored, in the first command queue meets the amount of data of one data management unit.

12. The memory storage device of claim 9, wherein the memory control circuit unit is further configured to activate a first counter, and
  after a count value of the first counter meets a first count value, the memory control circuit unit is further configured to store dummy data into the first command queue temporarily.

13. The memory storage device of claim 12, wherein the operation of transmit the write command sequence according to the first type command in the first command queue by the memory control circuit unit comprises:
  transmitting the write command sequence according to the first type command and the dummy data in the first command queue.

14. The memory storage device of claim 9, wherein the memory control circuit unit is further configured to activate a second counter, and
  if a count value of the second counter meets a second count value, the memory control circuit unit is further configured to transmit the write command sequence according to the first type command in the first command queue.

15. The memory storage device of claim 9, wherein the memory control circuit unit is further configured to maintain the first type command in the first command queue and temporarily not transmit the write command sequence in response to the second type command if the first command queue does not meet the preset condition.

16. The memory storage device of claim 9, wherein the first type command comprises a write command, and the second type command comprises one of a synchronous cache command, a write force unit access command and a read force unit access command.

17. A memory control circuit unit for controlling a rewritable non-volatile memory module, the memory control circuit unit comprising:
  a host interface configured to couple to a host system;
  a memory interface, configured to couple to the rewritable non-volatile memory module;
  a buffer memory; and
  a memory management circuit, coupled to the host interface, the memory interface and the buffer memory,
  wherein the memory management circuit is configured to receive a first type command from the host system and temporarily store the first type command to a first command queue of the buffer memory,
  after receiving the first type command, the memory management circuit is further configured to receive a second type command from the host system and temporarily store the second type command to a second command queue of the buffer memory,
  if the first command queue meets a preset condition, the memory management circuit is further configured to transmit a write command sequence which instructs a programming operation for programming the rewriteable non-volatile memory module according to the first type command in the first command queue,
  if the first command queue does not meet the preset condition, the memory management circuit is further configured to maintain the second type command in the second command queue and not to execute the second type command until the first command queue meets the preset condition, and
  after performing the programming operation, the memory management circuit is further configured to transmit a response message corresponding to the second type command in the second command queue to the host system, wherein the second type command indicates a storing of data in the buffer memory comprising the first command queue to the rewriteable non-volatile memory module.

18. The memory control circuit unit of claim 17, wherein the memory management circuit is further configured to record association information, wherein the association information is configured to associate the second type command in the second command queue with the first type command in the first command queue.

19. The memory control circuit unit of claim 17, wherein the memory management circuit is further configured to determine that the first command queue meets the preset condition if the amount of data, to be stored, in the first command queue meets the amount of data of one data management unit.

20. The memory control circuit unit of claim 17, wherein the memory management circuit is further configured to activate a first counter, and after a count value of the first counter meets a first count value, the memory management circuit is further configured to store dummy data into the first command queue temporarily.

21. The memory control circuit unit of claim 20, wherein the operation of transmit the write command sequence according to the first type command in the first command queue by the memory management circuit comprises:

transmitting the write command sequence according to the first type command and the dummy data in the first command queue.

22. The memory control circuit unit of claim 17, wherein the memory management circuit is further configured to activate a second counter, and if a count value of the second counter meets a second count value, the memory management circuit is further configured to transmit the write command sequence according to the first type command in the first command queue.

23. The memory control circuit unit of claim 17, wherein the memory management circuit is further configured to maintain the first type command in the first command queue and temporarily not transmit the write command sequence in response to the second type command if the first command queue does not meet the preset condition.

24. The memory control circuit unit of claim 17, wherein the first type command comprises a write command, and the second type command comprises one of a synchronous cache command, a write force unit access command and a read force unit access command.

* * * * *